March 5, 1963  W. POLLOCK ETAL  3,080,269
METHOD OF LINING PIPE
Filed May 21, 1959  2 Sheets-Sheet 1
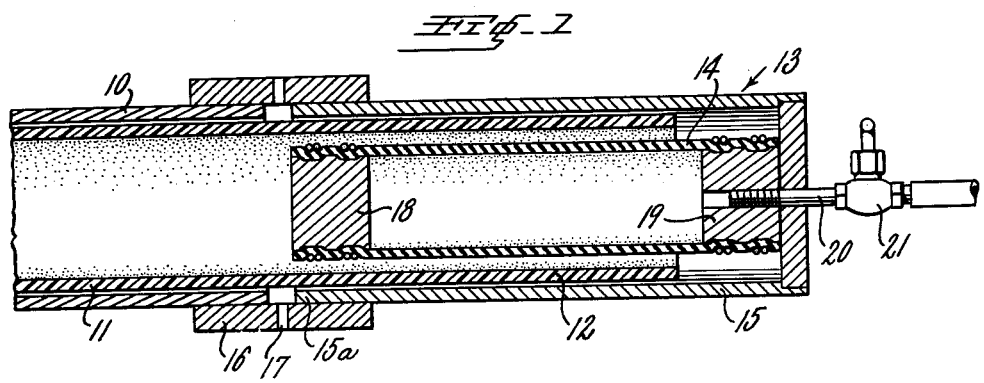
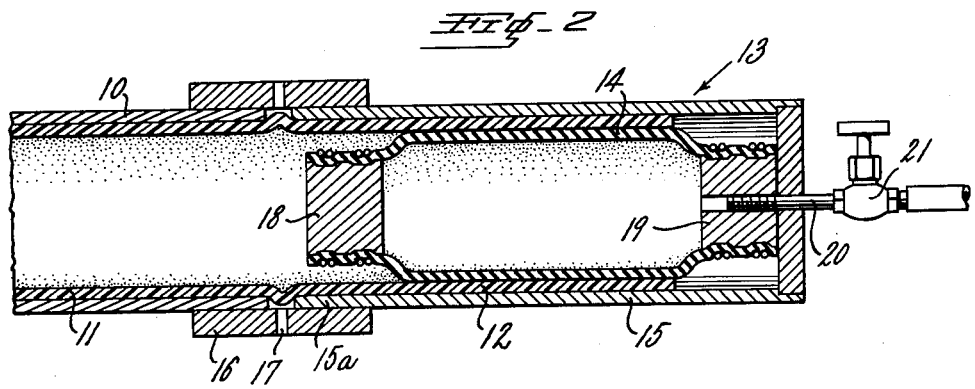
INVENTORS
GERARD H. PROVOST
WALTER POLLOCK
BY
Charles A. Blank
ATTORNEY

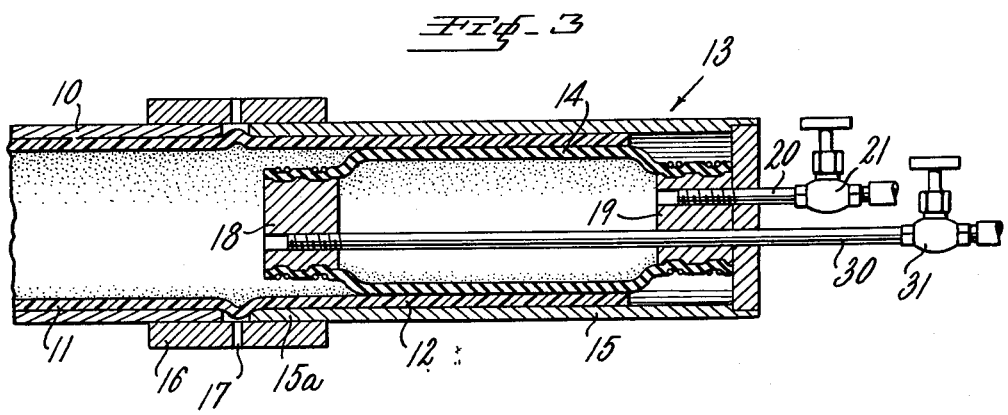

United States Patent Office 3,080,269
Patented Mar. 5, 1963

3,080,269
METHOD OF LINING PIPE
Walter Pollock, Norwich, Conn., and Gerard H. Provost, Clifton, N.J., assignors to United States Rubber Company, New York, N.Y., a corporation of New Jersey
Filed May 21, 1959, Ser. No. 814,742
2 Claims. (Cl. 156—87)

This invention relates to a method of lining pipe with plastic material. The term plastic material is intended to refer to material which may, for example, be a thermoplastic or thermosetting plastic, rubber or the like.

In prior methods of lining pipe with plastic material, it has been customary to introduce air under pressure into the lining tube. Solid end plugs have been employed to maintain end seals in the lining tube. Accordingly, when the lining tube expands during the manufacturing process, leakage of the compressed air from the lining tube may occur. Also, the use of high pressure inside the lining tube may cause the lining to expand too quickly to allow air to escape between the lining tube and the pipe, resulting in non-uniformities or "blow-outs" in the lining.

It is an object of the present invention, therefore, to avoid one or more of the above mentioned disadvantages and limitations of prior methods of lining pipe.

It is another object of the invention to provide a new and improved method of lining pipe with plastic material which is not subject to "blow-outs" of the lining during manufacture.

It is another object of the invention to provide a new and improved method of lining pipe with thermoplastic material which is not subject to leakage of air pressure from the interior of the lining tube during manufacture.

In accordance with a particular form of the invention, a method of lining pipe with thermoplastic material comprises applying an adhesive to at least one of a pipe to be lined and a lining tube of thermoplastic material which is longer than the pipe. The method also comprises inserting the lining tube in the pipe with the tube projecting from each end of the pipe, placing an inflatable end sealer inside each end of the lining tube and placing an outer coupling member supporting the sealing member and of approximately the same diameter as the pipe outside each end of the lining tube, clamping the outer coupling members to the pipe while maintaining a vent between each end of the pipe and the ends of the coupling members to allow air to escape between the pipe and the lining tube, inflating the end sealing members to expand them against the lining tube, and heating the pipe, lining tube, and end sealing members to expand the lining tube in the regions of the end sealing members into intimate contact with the pipe and to expand the end sealing members with the lining tube against the outer coupling members to maintain the seal.

For a better understanding of the present invention, together with other and further objects thereof, reference is made to the following description taken in connection with the accompanying drawing, and its scope will be pointed out in the appended claims.

Referring to the drawings:

FIG. 1 is a fragmentary view, in section, of a pipe to be lined, with a lining tube and end sealer installed in accordance with the method of the present invention;

FIG. 2 is a fragmentary view, in section, of the FIG. 1 pipe, lining tube, and end sealer after the lining has been expanded in accordance with the method of the present invention; and FIG. 3 is a fragmentary view, in section, of a pipe, lining tube, and end sealer after the lining has been expanded in accordance with the method of the present invention.

Referring now more particularly to FIG. 1 of the drawings, the interior surface of a metal pipe 10 is cleaned in an appropriate manner, for example, by sand blasting or by means of a solvent. A suitable adhesive is applied to interior of the pipe 10 and to exterior of a lining tube 11, which may, for example, be of thermoplastic material, such as a vinyl-type resin, or of a thermosetting material, such as rubber in an uncured or semi-cured stage. The lining tube 11 then is inserted in the pipe 10 as represented in FIG. 1, with an end portion 12 projecting from each end of the pipe 10.

An inflatable end sealer 13 comprising an inflatable member 14 and an outer coupling member 15 is placed at each end of the lining tube 11 with the inflatable member 14 inside the lining tube and the outer coupling member 15 outside the lining tube. The diameter of the outer coupling member 15 preferably is approximately the same as the diameter of the pipe 10. The end 15a of the outer coupling member 15 preferably is spaced from the end of the pipe 10 to form a gap or vent to allow air to escape between the pipe 10 and the lining tube 11. To this end, a clamp 16 for attaching the end sealer to the pipe 10 has an aperture 17 therein aligned with the gap between the outer coupling member 15 and the pipe 10.

The end sealer 13 includes a pair of metal end caps or plugs 18, 19, and clamp rings for closing the inflatable member 14. Alternatively, the inflatable member of the end sealer might simply be an inflatable bag. There is inserted in the end cap 19 a filler tube 20 having an associated valve 21 for controlling the inflation of the end sealer.

The end sealer 13 and the end sealer at the other end of the pipe 10 (not shown) are then inflated to a pressure of, for example, 30 to 60 pounds to expand the end sealers against the lining tube. The assembly of pipe 10, lining tube 11, and end sealers is then heated in an oven to, for example, 200° F.–300° F., to expand the lining tube against the pipe and to expand the end sealers with the lining tube to maintain the seal, as represented in FIG. 2. While the assembly is being heated and the lining tube is expanding, air escapes between the lining tube 11 and the metal pipe 10 through the gap between the end of the pipe 10 and the end 15a of the outer coupling member of the end sealer and through the aperture 17 in the clamp 16. Because the gap between the end of the pipe 10 and the end 15a of the outer coupling member is small, the chances of "blowing out" at the gap are minimized. Also, because the end sealer utilizes an inflatable member which expands with the lining tube 11, there is a pressure build-up within the lining tube 11 to cause extension of the tube with minimum air leakage during the heating cycle. Thereafter, the assembly is cooled and the end sealers are removed. The end of the thermoplastic lining tube extending beyond the pipe 10 may then be cut to be flush with the pipe.

If desired, as represented in FIG. 3 a tube 30 having a valve 31 may extend through the end sealer to apply additional air pressure, for example, 30 pounds per square inch, inside the lining tube 11 in the event that the lining tube is of a relatively rigid material.

While there has been described what is at present considered to be the preferred method in accordance with this invention, it will be obvious to those skilled in the art that various changes and modifications may be made therein, without departing from the invention, and it is, therefore, aimed to cover all such changes and modifications as fall within the true spirit and scope of the invention.

Having thus described our invention, what we claim and desire to protect by Letters Patent is:

1. A method of lining pipe with thermoplastic material comprising: applying an adhesive to at least one of a pipe to be lined and a lining tube of thermoplastic material which is longer than the pipe, inserting the lining tube in the pipe with the tube projecting from each end of the pipe, placing an inflatable end sealing member inside each end of the lining tube and placing an outer coupling member supporting the sealing member and of approximately the same diameter as the pipe outside each end of the lining tube, clamping the outer coupling members to the pipe while maintaining a vent between each end of the pipe and the ends of the coupling members to allow air to escape between the pipe and the lining tube, inflating the end sealing members to expand them against the lining tube, and heating the pipe, lining tube and end sealing members to expand the lining tube in the regions of the end sealing members into intimate contact with the pipe and to expand the end sealing members with the lining tube against the outer coupling members to maintain the seal.

2. A method of lining pipe with thermoplastic material comprising: cleaning the inner surface of a metal pipe to be lined, applying an adhesive to the inner surface of the pipe and to the outer surface of a lining tube of thermoplastic material which is longer than the pipe, inserting the lining tube in the pipe with the tube projecting from each end of the pipe, placing an inflatable end sealing member inside each end of the lining tube and an outer coupling member supporting the sealing member and of approximately the same diameter as the pipe outside each end of the lining tube, clamping the outer coupling members to the pipe while maintaining a vent between each end of the pipe and the end of the coupling member to allow air to escape between the pipe and the lining tube, inflating the end sealing members to expand them against the lining tube, and heating the pipe, lining tube and end sealing members to expand the lining tube in the regions of the end sealing members into intimate contact with the pipe and to expand the sealing members with the lining tube against the outer coupling members to maintain the seal, and thereafter cooling the pipe, lining tube and end sealing members while assembled as a unit and with the end sealing members still inflated.

References Cited in the file of this patent

UNITED STATES PATENTS

| | | |
|---|---|---|
| 2,312,993 | Stephens | Mar. 2, 1943 |
| 2,440,725 | Munger | May 4, 1948 |
| 2,608,501 | Kimble | Aug. 26, 1952 |
| 2,779,996 | Tanis | Feb. 5, 1957 |

FOREIGN PATENTS

| | | |
|---|---|---|
| 374,842 | Great Britain | June 2, 1932 |
| 453,123 | Great Britain | Sept. 1, 1936 |